United States Patent
Kurita

[15] 3,690,462
[45] Sept. 12, 1972

[54] FILTER PRESS WITH ENDLESS FILTER CLOTH

[72] Inventor: Ken-ichiro Kurita, 36-4, 5-chome, Senriyama-nishi, Suita, Japan

[22] Filed: March 11, 1970

[21] Appl. No.: 18,459

[52] U.S. Cl. ................................................210/225
[51] Int. Cl. ...........................................B01d 25/32
[58] Field of Search............................100/198, 199; 210/225–230, 216, 297, 387

[56] References Cited

UNITED STATES PATENTS 3,360,130  12/1967  Kaga.........................210/225
2,969,148  1/1961  Hirs.......................210/387 X

FOREIGN PATENTS OR APPLICATIONS 1,080,461  8/1967  Great Britain.............100/198

Primary Examiner—Reuben Friedman
Assistant Examiner—T. A. Granger
Attorney—McCarthy, De Paoli & O'Brien

[57] ABSTRACT

A filter press of plate-and-frame type or recessed plate type is provided with an endless filter cloth which is passed under each of filter elements and over a filter element adjacent thereto in zigzag form. Rollers and drive means for moving the filter cloth in the zigzag form are also provided. The filter cloth is passed through a washing vessel disposed on the frame of the filter press in which the surface of the cloth is cleaned by washing means such as wash liquor ejecting pipes.

4 Claims, 7 Drawing Figures

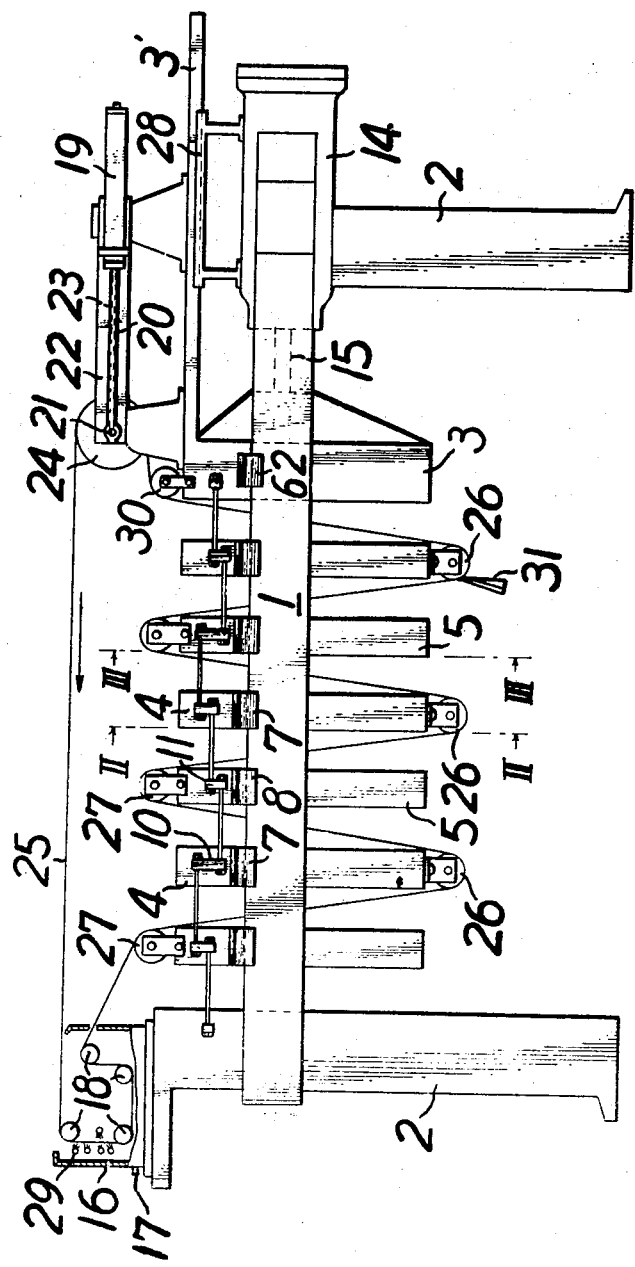

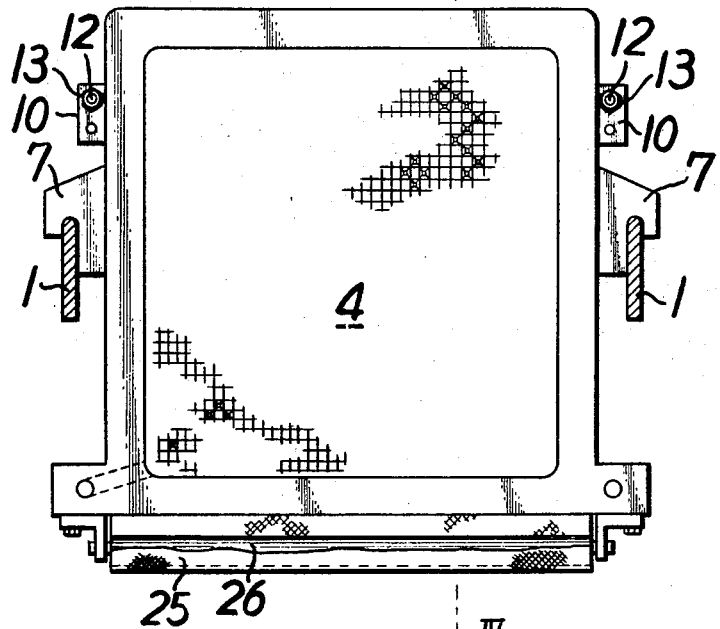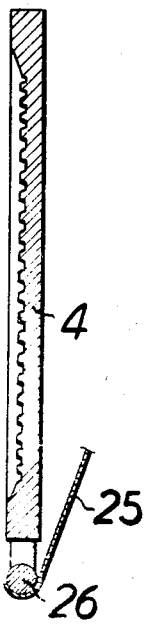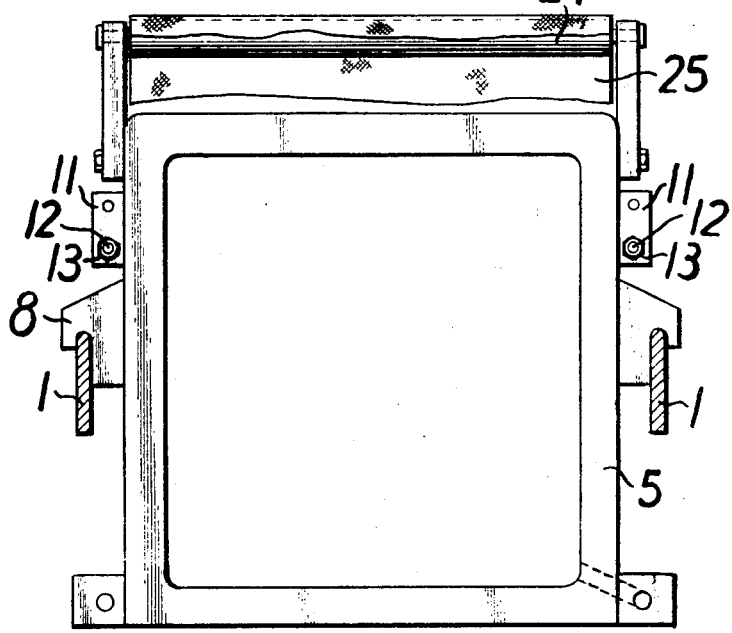

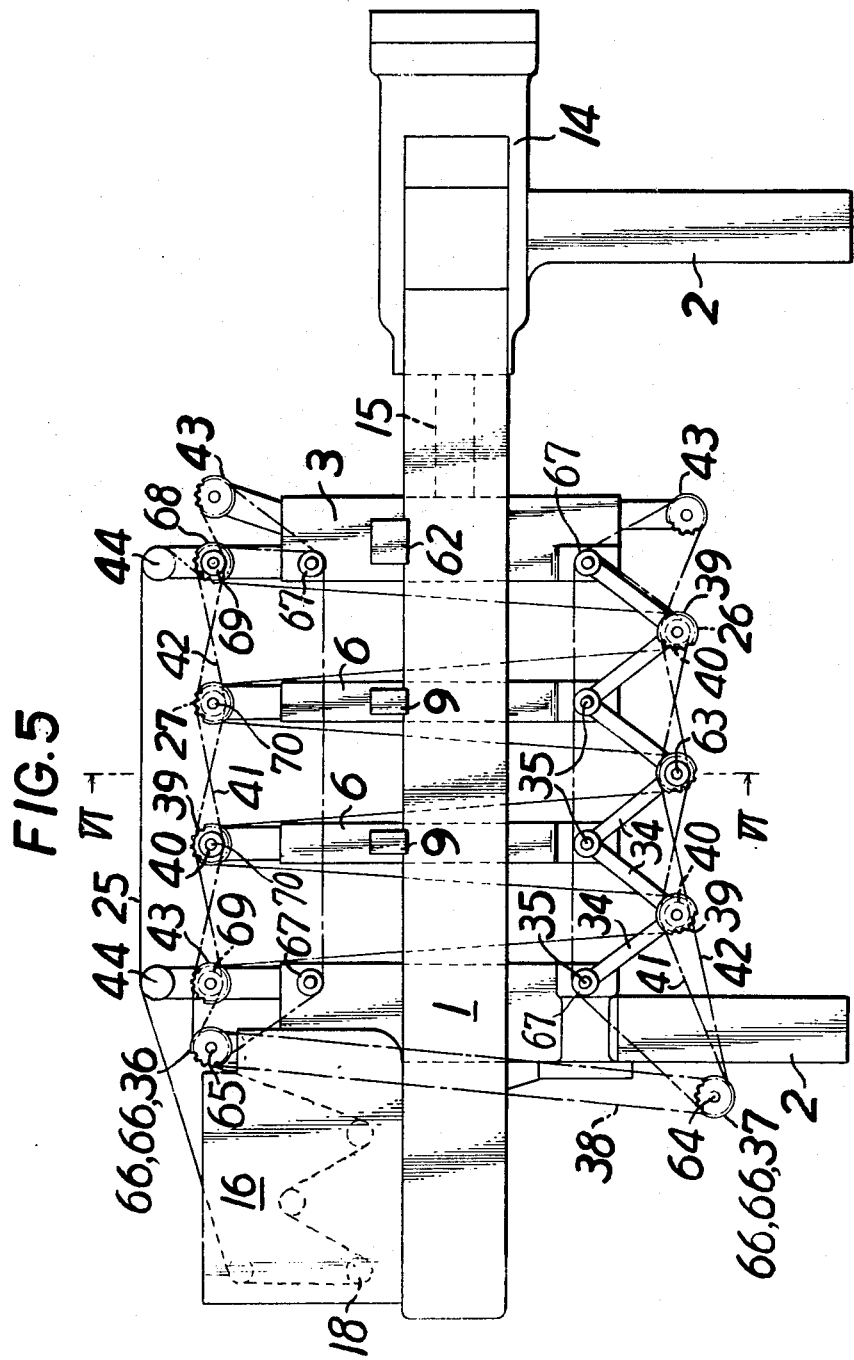

FILTER PRESS WITH ENDLESS FILTER CLOTH

BACKGROUND OF THE INVENTION

The present invention relates to a filter press, more particularly to a filter press of the type in which a continuous sheet of filter cloth employed for all of the filter elements in common is moved in endless manner.

In a filter press, the cake deposited during filtering operation is removed from the filter cloth. When the cloth wears out due to repeated operations and becomes no longer fit for use, there is a need to replace it with a new cloth. In a filter press of conventional type, however, the filter cloth, which is attached to the respective filter plates separately, requires a long period of time for replacement and is therefore very uneconomical and inefficient. In addition, due to the troubles of replacement, the filter cloth is not replaced as frequently as desired and the wear of the cloth deteriorates the efficiency of the press, while the worn out cloth can not be used again even if it is washed after replacement. These are the problems which further aggravate the above-described economy of the filter press.

BRIEF SUMMARY OF THE INVENTION

An object of the present invention is to provide a filter press in which a continuous sheet of filter cloth is hung on filter plates irrespective of the number of the plates, the structure being such that when the filter cloth gets soiled by filtration the soiled cloth is wound up at one side to run out clean cloth at the other side so as to make clean cloth available all the time for improved efficiency and economy of the filter press.

Another object of the present invention is to provide a filter press in which a continuous sheet of filter cloth is hung on filter plates in endless fashion irrespective of the number of the plates and in which the filter cloth is adapted to be moved by a motor or the like when desired so that a portion of the cloth used for filtration can be replaced with a clean portion of the cloth. In accordance with the structure of this filter press, the used portion of the cloth is moved out of filtering section into a washing vessel for automatic washing operation so as to effect filtration with a clean cloth all the time until a structural defect of the cloth such as a rent or hole makes it no longer fit for use, utmost efficiency and economy thus being ensured.

The filter press as herein referred to includes both plate-and-frame type and recessed plate type.

In accordance with the present invention, filter cloth is hung on respective filtering units each comprising a plate and frame or respective recessed-type filter plates in zigzag manner so as to form a continuous strip of cloth and when washing is required the strip is moved to provide a new filtering portion for the filtering faces of the plates. Accordingly, as compared with separate sheets of filter cloth attached to the respective filter plates, renewal of the filtering face can be effected extremely easily and quickly with resultant improvement in efficiency and economy.

The continuous strip of filter cloth, being endless, can be so disposed that part thereof passes through a washing vessel. When desired, therefore, the filter cloth is driven into the washing vessel for washing and the cleaned portion of the cloth is brought to the filtering section so as to effect filtration with best efficiency. In spite of the deposition of filter cake there is no need to replace the filter cloth but the cloth once put on the press can be used over and over until a structural defect develops therein. This merit ensures marked improvement in the efficiency and economy of the filter press.

The features of and improvements in the present invention will become apparent from the following detailed description with reference to the accompanying drawings.

BRIEF DESCRIPTION OF THE DRAWINGS

FIG. 1 is a side elevation showing an embodiment of the filter press in accordance with the present invention.

FIG. 2 is a front view in vertical section taken along the line II—II in FIG. 1;

FIG. 3 is a front view in vertical section taken along the line III—III in FIG. 1;

FIG. 4 is a side elevation in vertical section taken along the line IV—IV in FIG. 2;

FIG. 5 is a side elevation showing another embodiment of the filter press in accordance with the present invention;

DETAILED DESCRIPTION OF THE PREFERRED EMBODIMENTS

Figure 6:
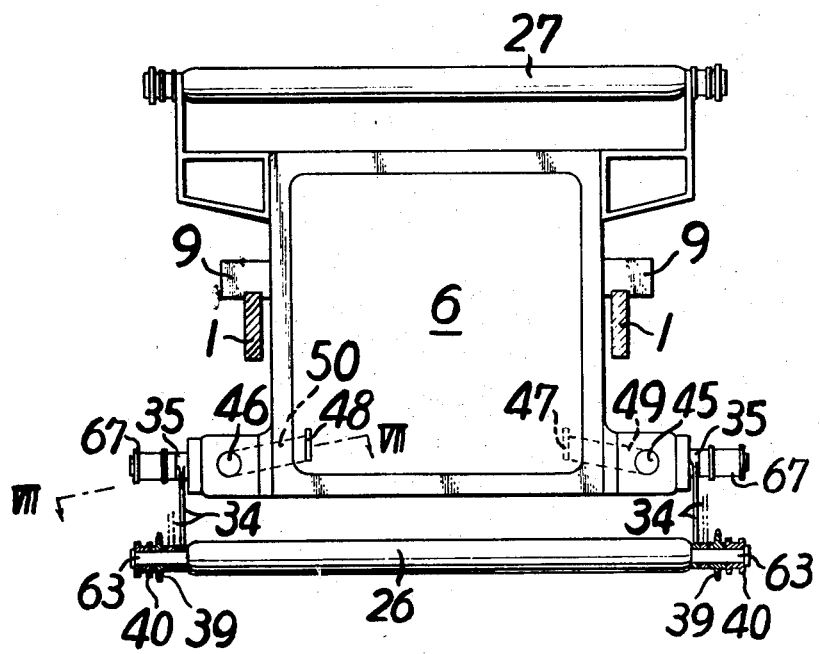
FIG. 6 is a front view in vertical section taken along the line VI—VI in FIG. 5.
Figure 7:
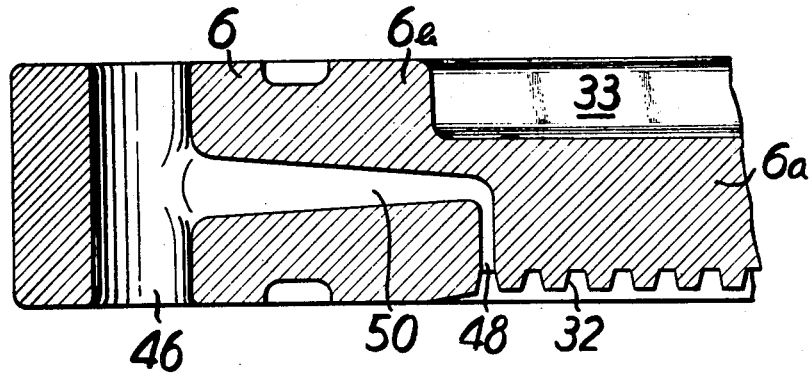
FIG. 7 is a sectional view taken along the line VII—VII in FIG. 6.

Referring to the embodiment in FIG. 1, designated at 1 are side bars of the filter press which are disposed in parallel at the front and rear as seen in FIG. 1, with opposite ends of each side bar supported on frames 2 on the right and left. Filter plates 4 and filter frames 5, alternately arranged in a row, are hung on these two side bars 1 with respective opposite arms 7 and 8 supported on the side bars 1 in movable manner. As shown in FIGS. 1 and 2, each of the filter plates 4 is provided with projections 10 on the opposite sides thereof, while it will be seen form FIGS. 1 and 3 that each of the frames 5 is provided with projections 11 on its opposite sides. The projections 10 and 11, facing each other, of the adjacent plate 4 and frame 5 are linked together by means of bolts 12 and nuts 13 to limit the separation between the plate and frame. Further, the plate 4 and frame 5 on the extreme right and left are respectively connected to a movable end plate 3 and the frame 2 in the similar manner. Designated at 14 is a hydraulic cylinder for moving the movable end plate 3 back and forth. The ram 15 thereof is connected to the movable end plate 3. Numeral 16 indicates a washing vessel positioned on one of the frames 2 and provided with a drain 17 and a suitable number of rotatable guide rollers 18. The other frame 2 carrying the hydraulic cylinder 14 is further provided with a pair of cylinders 19 disposed in the front and rear in FIG. 1. Provided at the forward end of piston 20 of each cylinder 19 is a tension roller 24 whose shaft 21 is movably inserted into a slot 23 in a guide plate 22. Filter cloth 25 is passed over the tension roller 24, lower rollers 26 attached to the undersides of the respective filter plates 4, upper rollers 27 mounted on the upper sides of the respective filter frames 5 and further along guide rollers 18 positioned within the washing vessel 16 on the frame 2. In this manner the filter cloth 25 is disposed between respective plates 4 and frames 5 in zigzag and endless fashion. When required, the tension roller 24 is driven, for instance, by a motor. The hydraulic cylinder 14 is built in the other frame 2, on which is mounted a support 28 for supporting upper extension 3' extending backward from the upper portion of the movable end plate 3. The tension roller means described above is mounted on the upper extension 3'. The washing vessel 16 is provided with ejecting pipes 29 for discharging a washing liquor such as water, ammonia or the like. These ejecting pipes 29 are arranged in desired positions in the washing vessel 16 and directed toward the front and rear faces of the filter cloth 25 to be sent forward by guide rollers 18. When desired, the ejecting pipes 29 may be equipped with nozzles at the ejecting holes. Designated at 30 is a guide roller and at 31, a scraper.

The operation of the embodiment in FIG. 1 will now be described. When the movable end plate 3 is pushed forward by the ram 15 of the hydraulic cylinder 14 to bring respective plates 4 and frames 5 together for filtration with the cloth 25 brought into pressing contact with the opposite faces of the plates 4 and frames 5, the cylinders 19 are actuated to move the tension roller 24 backward and keep the filter cloth 25 taut which tends to slack due to the forward movement of the end plate 3. The filtering operation is then carried out. When the operation is completed, the movable end plate 3 is retracted by the ram 15 of the hydraulic cylinder 14 to release the plates 4 and frames 5 one after another to allow the filter cake to drop downward. At this time the tension roller 24 is advanced by the forward movement of the cylinder 19, whereby the filter cloth 25 held taut during operation is loosened as the end plate 3 is moved backward for the removal of the filter cake. When the filter cloth 25 is moved in the direction of an arrow in the drawing by driving the tension roller 24, the filter cake is removed from the surface of the filter cloth 25 by means of the scraper 31 and the cloth is sent by the tension roller 24 into the washing vessel 16, where the surface is cleaned with a liquor discharged from the ejecting pipes 29. The scraper 31 may be used when desired.

FIG. 5 shows an embodiment in which the filter plate and filter frame as employed in the foregoing embodiment are made into a filter plate 6, a single plate, which functions also as a filter frame. The filter plate 6 is so-called recessed-plate type and has a main part 6a one surface of which is provided with projections 32, the other surface being formed with a recessed portion 33 of a suitable depth defined by the outer peripheral edge 6b. As in the embodiment shown in FIG. 1, arms 9 provided on the opposite sides are supported on two parallel side bars 1 in movable manner. Each of a number of the plates 6 thus supported is provided, at a lower portion, with a pair of links 34 mounted on a pivot 35 on each of the front and rear sides thereof. The ends of the respective links 34 are connected to a shaft 63 carrying lower rollers 26 and disposed at a lower position between each two adjacent plates 6, the plates 6 being associated with one another by these links. It will be seen in FIG. 5 that the plates 6 at the right and left end positions are respectively connected by links 34 to the movable end plate 3 and one of the frames 2 in like manner. Filter cloth 25 is passed over two guide rollers 44 mounted on the frame 2 and movable end plate 3, along upper rollers 27 and lower rollers 26, and along the guide rollers 18 in the washing vessel 16. The filter cloth is therefore hung on and disposed between respective filter plates 6 in zigzag and endless form. Driven sprockets 36 mounted on the upper opposite sides of one of the frames 2 are driven through chains 38 by drive sprockets 37 mounted on a lower drive shaft 64 which is driven by an unillustrated motor. The drive shaft 64 and follower shaft 65 driven by the shaft 64 are each provided, at the opposite ends, with two sprockets 66 for driving the lower and upper rollers. The upper roller 27 and lower roller 26 are respectively provided with drive sprockets 39 and idle wheels 40 mounted on shaft 70 and shaft 63. With respect to each two adjacent rollers, the position relationship between the drive sprocket 39 and the idle wheel 40, one to be positioned inwardly of the other, is reversed. At each of opposite ends of the upper rollers 27 and lower rollers 26, therefore, the sprocket 39 and wheel 40 are disposed inwardly or outwardly of each other alternately to provide inner and outer chain lines 41 and 42 as will be described below. The two inner and outer chain lines are each associated with sprockets 39 and idle wheels 40 alternately at respective rollers. At each end of one roller, the drive sprocket 39 is associated with one of the chain lines while the idle wheel 40 is associated with the other chain line. The outer chain 41 in engagement with the outer sprockets 66 on each of the follower shaft 65 and the drive shaft 64 is passed over the drive sprockets 39 and idle wheels 40 which are positioned along the outer chain line, whereas the inner chain 42 engaged with the inner sprockets 66 is passed over the drive sprockets 39 and idle wheels 40 along the inner chain line. Accordingly, each of the upper rollers 27 and lower rollers 26 is provided with the rotation of the drive shaft 64 and follower shaft 65 by way of the outer chain 41 or the inner chain 42 with which its drive sprocket 39 is engaged. The outer chain 41 for driving the upper rollers 27 is also reeved around two other auxiliary sprockets 43, one independent auxiliary idle wheel 69 and two common auxiliary idle wheels 67 which are positioned along the outer chain line, while the inner chain 42 is passed around one auxiliary sprocket 68, one independent auxiliary idle wheel 69 and the two common auxiliary idle wheels 67 which are aligned on the inner chain line. The outer chain 41 for driving the lower rollers 26 is passed around one auxiliary sprocket 43 and four common auxiliary idle wheels 67 which are positioned on the outer chain line. The inner chain 42 is passed over the four common auxiliary idle wheels 67 which are positioned on the inner chain line. The upper rollers 27 and the lower rollers 26 are driven in the same direction by the drive shaft 64.

The operation of this embodiment will be described. When the movable end plate 3 is pushed forward by the ram 15 of the hydraulic cylinder 14 and the respective filter plates 6 are brought into pressing contact with one another for filtration, the filter cloth 25 is pressed against the surfaces of the plates 6, so that one surface of each filter plate 6, namely the recessed portion 33 serves as a cake chamber. When filtration is completed, the movable end plate 3 is retracted by the ram 15 to release the filter plates from one another to allow the filter cake to drop therefrom. In the case where there arises a necessity to replace the filter cloth 25 with a new cloth 25 after a period of operation, the plates 6 are brought into separated position and the driven sprocket 37 is rotated by the motor to drive the upper rollers 27 and lower rollers 26 in the same direction. As a result, the cloth 25 is sent into the washing vessel 16 along the upper and lower rollers 27, 26 and two guide rollers 44 and subjected to a suitable wash liquor for cleaning in the same manner as in the foregoing embodiment. In accordance with this embodiment, the slack of the cloth during filtration is eliminated by the rollers 26 which are lowered when the links 34 are brought into closed position.

The projections 32 on the filter plates 6 are provided in the shape such as of truncated pyramids and recessed portions are formed between the projections. Designated at 45 is an inlet 45 for a liquid to be filtered. When the filter plates are brought together, the respective inlets 45 form a continuous tubular passage which is separated from filtrate outlets 46 to be described later. The prefilt supplied is passed through the inlet 45 and a hole 49 which is communicated therewith and admitted into the cake chamber 33 of the plate through an opening 47. The prefilt introduced into the cake chamber 33 is further passed through the filter cloth 25 disposed between the filter plates 6 into the filtering side of the adjacent plate 6. The filtrate then flows between the projections 32 into a hole 50 through an opening 48 and reaches an outlet 46 which is formed into a tubular passage. The filtrate is thus recovered.

I claim:
1. A horizontal filter press comprising:
   A. a plurality of recessed filter plates serving as both filter plates and filter frames which are adapted to be moved horizontally and longitudinally between a stationary frame and a movable end plate;
   B. a ram means for pressing said recessed filter plates by said movable end plate during filtering operations and for separating said recessed filter plates;
   C. a plurality of upper rollers, each of which is rotatively attached to and in parallel with an upper horizontal side of one of said recessed filter plates;
   D. a plurality of lower rollers, each of which is parallel with the lower horizontal sides of said recessed filter plates;
   E. a washing vessel mounted on said stationary frame and having rotatably mounted guide rollers;
   F. a cloth tautening means which also limits the separation of said recessed filter plates by a predetermined distance, comprising a plurality of pairs of pivotal links of equal length, each pair being pivotably interconnected and rotatively attached, at one end, to the shaft of one of said lower rollers and, at the other end, being pivotably attached to the lower portions and at the front and rear sides of:
      1. each two adjacent recessed filter plates,
      2. said stationary frame and a recessed filter plate adjacent thereto, and
      3. said movable end plate and the recessed filter plate adjacent thereto, the length of said links being selected so that the change in vertical distance between a vertically related pair of upper and lower rollers compensates for the changed length of cloth as the press opens or closes, whereby said lower rollers are rotatively disposed at a lower position between each two adjacent recessed filter plates; and
   G. a continuous filter cloth which is passed sequentially, in zigzag fashion, under and over each of said lower and upper rollers, respectively, and around said guide rollers in passage through said washing vessel.

2. The filter press of claim 1, wherein guide rollers are provided above said stationary frame and above said movable end plate and around which said continuous filter cloth passes.

3. The filter press of claim 2 wherein said cloth is selectively replaced for cleaning in said washing vessel by a motor driving inner and outer chain lines which pass over pairs of drive sprockets and idle wheels on each opposite end of each of said upper rollers and lower rollers, the inward position relationship of the drive sprocket and idle wheel in each of said pairs being alternately reversed on each two adjacent rollers.

4. In a horizontal filter press comprising a plurality of filtering elements consisting of alternatively arranged filter plates and filter frames which are adapted to be moved horizontally and longitudinally between a stationary frame and a movable end plate, a continuous filter cloth, and a ram means for pressing said filter plates and filter frames by said movable end plate during filtering operations and for separating said filter plates and said filter frames, the combination comprising:
   A. a plurality of lower rollers, each of which is rotatively attached to and in parallel with a lower horizontal edge of one of said filter plates;
   B. a plurality of upper rollers, each of which is rotatively attached to and in parallel with an upper horizontal edge of one of said filter frames;
   C. a washing vessel mounted on said stationary frame and having rotatably mounted guide rollers;
   D. a cloth tautening means which comprises:
      1. a guide plate, having a slot therein, which is horizontally and longitudinally mounted on said movable end plate,
      2. a pressure-operated fluid cylinder means which is mounted on said movable end plate, and
      3. A tension roller which is rotatably attached to said fluid cylinder means and which is slideably attached to said guide plate,
   E. a continuous filter cloth which is passed sequentially, in zigzag fashion, under and over each of said lower and upper rollers, respectively, around said guide rollers in passage through said washing vessel, and around said tension roller, whereby said fluid cylinder means moves said tension roller backward, thereby keeping said cloth taut when said ram means pushes said movable end plate forward to bring said alternatively arranged filter plates and filter frames together for filtration, and moves said tension roller forward, thereby selectively loosening said cloth when said ram means retracts said movable end plate to release said filter plate and filter frames; and
   F. a sequential opening and closing means for limiting the separation of said filter plates and said filter frames by a predetermined distance, comprising:

1. a projection on opposite sides of each filter plate, each filter frame, said stationary frame, and said movable end plate; and
2. a bolt which connects together each two projections in facing relationship on:
   a. each adjacent filter plate and each adjacent filter frame,
   b. said stationary frame and the filter frame adjacent thereto, and
   c. the movable end plate and the filter plate adjacent thereto, so that said filter plate and said filter frame are brought together or separated from each other one after the other, said filter cloth being passed along said lower roller attached to each of said filter plates and over said upper roller mounted on each of said filter frames in a zigzag manner.

* * * * *